United States Patent [19]
Trader et al.

[11] Patent Number: 5,832,432
[45] Date of Patent: Nov. 3, 1998

[54] METHOD FOR CONVERTING A TEXT CLASSIFIED AD TO A NATURAL SOUNDING AUDIO AD

[75] Inventors: Terry F. Trader, Castle Rock; Matthew J. Bixler, Denver; Michael J. Bishara, Westminster; Eliot M. Case, Denver; Carol A. Erbes, Parker; Barbara J. Warden, Golden, all of Colo.

[73] Assignees: US West, Inc., Denver; MediaOne Group, Inc., Englewood, both of Colo.

[21] Appl. No.: 584,414

[22] Filed: Jan. 9, 1996

[51] Int. Cl.$^6$ ........................................ G10L 5/02
[52] U.S. Cl. ................................. 704/260; 704/272
[58] Field of Search .................... 395/2.67, 2.69, 395/2.79, 2.81, 2.86, 214, 226, 227, 796, 792, 793; 704/260, 272, 275, 270, 277, 278, 258

[56] References Cited

U.S. PATENT DOCUMENTS

| | | | |
|---|---|---|---|
| 4,645,873 | 2/1987 | Chomet | 379/95 |
| 4,979,216 | 12/1990 | Malsheen et al. | 395/2.69 |
| 5,164,981 | 11/1992 | Mitchell et al. | |
| 5,212,731 | 5/1993 | Zimmermann | 395/2.69 |
| 5,283,731 | 2/1994 | Lalonde et al. | 395/201 |
| 5,384,893 | 1/1995 | Hutchins | 395/2.67 |

OTHER PUBLICATIONS

Electronic Marketplace Reports, v8, n1, p5, "Ameritech, Heritage to Offer Electronic Classifieds". Jan. 17, 1994.
Edge on S About AT&T, v9, n323, p.4, Electronic Classifieds: US West Marketing Resources Terms With Denver's Rocky Mountain News, Oct. 3, 1994.

Primary Examiner—Richemond Dorvil
Attorney, Agent, or Firm—Brooks & Kushman; Judson D. Cary

[57] ABSTRACT

A method of updating or expanding an audio classified ad database with text ads obtained from the databases of print media organizations such as newspapers is disclosed. Ads from a print media ad database are downloaded to a host processor that identifies relevant ads, such as those dealing with autos, and converts the abbreviated text of the print ad to an expanded version of the ad. The words and phrases of the expanded version are parsed and stored in appropriate fields of a relational database. A sequenced play list of audio file numbers corresponding to the words and phrases contained in a database record is created along with "glue" words and phrases that are added to produce a more natural sounding audio. The sequenced list is stored in an audio ad database and is retrieved and assembled to play the audio version of the ad in response to a command from a remote user.

10 Claims, 7 Drawing Sheets

METHOD FOR CONVERTING A TEXT CLASSIFIED AD TO A NATURAL SOUNDING AUDIO AD

TECHNICAL FIELD

This invention relates to computerized classified advertisement (ad) systems and more particularly to a method of converting an unstructured text ad such as found in newspapers and other print media to a more natural sounding text version that is searchable and can be easily converted to a scripted audio ad accessible to a potential buyer through existing telecommunication equipment.

BACKGROUND ART

Classified advertising has been utilized by the print media for many years. In particular, newspapers and magazines utilize this device to generate revenue from individuals or other relatively small sellers who could otherwise not afford to advertise goods and services they wish to sell. Classified advertising has also served buyers in allowing them access to goods or services from these individuals or small sellers. Classified advertising is also used by large volume sellers to reach users who look to such advertising for items such as homes or automobiles. Thus, classified advertising has proven very useful over the years in bringing buyers and sellers together.

Some publications such as newspapers have attempted to augment their printed classified advertising by offering telephonic electronic classified advertising. Electronic classified ads are intended to allow sellers of goods and services the ability to augment their print ad with an audio ad. Electronic classified advertising may solve many needs that are currently unmet by print ads alone. For example, the potential buyer can hear more detail about the product or service being offered than is included in the printed ad without having to talk directly to the seller. The electronic ad can be updated frequently to show changes in price or availability of the goods and/or services. Advantages such as these allow the publication to have greater success in selling its classified ads.

Existing electronic classified advertising systems have thus helped publishers to sell their advertising, sellers to sell their goods and services, and buyers to purchase same. However, existing electronic classified advertising systems have limitations that inhibit their usefulness. One of the limitations is the inability to readily augment or update the audio ad database with ads derived from print media such as newspapers. Presently, each ad must be recorded in a studio and edited and placed on the system. This is an extremely expensive process.

SUMMARY OF THE INVENTION

The present invention provides a method of updating or augmenting an audio classified ad database with text ads obtained from the databases of print media organizations such as newspapers. The newspaper ad text is received in electronic form and stored on a computer and automatically processed using concatenated speech. The computer is programmed to identify relevant newspaper ads, such as those dealing with autos, and to convert the abbreviated text to an expanded version of the ad. The words and phrases of the expanded version are parsed and stored in a relational database of text ads. A sequenced play list of addresses pointing to stored audio files of the words and phrases contained in each ad as well as "glue" words and phrases for connecting the ad words, is created from the text database and stored in the audio data base. The "glue" words and phrases are intended to render the scripted ad more natural sounding. The relational database storing the text words may be searched and reported or displayed in various formats. Once an ad is located for a remote customer the list containing the audio file addresses is retrieved and played for the customer.

BEST MODE FOR CARRYING OUT THE INVENTION

Figure 1:
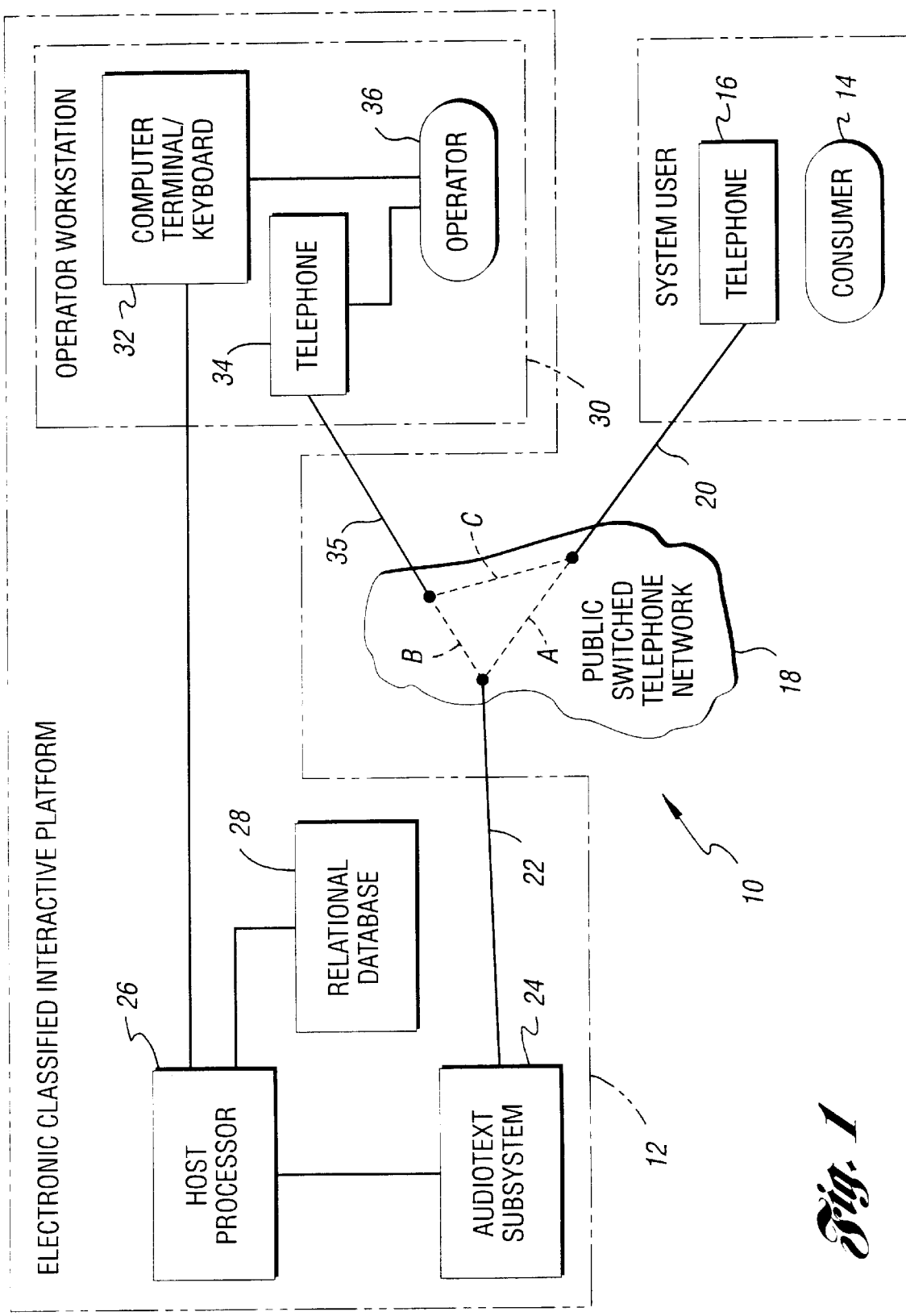
FIG. 1 is a generalized block diagram of the system of the present invention.

Referring now to the drawings and initially to FIG. 1, there is shown a general block diagram of a system in which the method of the present invention is performed. The system is denoted generally by reference numeral 10 and includes an interactive platform 12, such as an electronic classified interactive platform. The interactive platform 12 is essentially an automated operator, taking the place of a human operator for initially establishing interactive data exchange between an outside caller 14, such as a consumer. The outside caller 14 utilizes an outside telephone apparatus 16, such as a touchtone telephone, to communicate with the interactive platform 12.

The telephone apparatus 16 is connected to a Public Switched Telephone Network (PSTN) 18 via a standard business or residence telephone line 20. The PSTN 18 is a local telephone provider, such as a Regional Bell Operating Company (RBOC), e.g., U.S. West or Nynex, or a Local Exchange Company (LEC). The interactive platform 12 is also connected to the PSTN 18 utilizing, preferably, two-way Direct Inward Dialing (DID) type telephone lines 22 equipped with a call transfer feature. The call transfer feature allows a call from one station or extension to be transferred to another.

The interactive platform 12 includes an audiotex subsystem 24 for providing audio output signals in response to telephone signals received from the outside caller 14. The audiotex subsystem 24 is a personal computer with an extended back plane that houses audio processing circuit boards. The audiotex subsystem 24 has a hard drive that contains all of the audio files needed to play most auto or home classified ads and system prompts, operating system software, application software, configuration tables, log files and other miscellaneous tables necessary to support the present application and configuration. The audiotex subsystem 24 is capable of recognizing the touch tone inputs, deciding which prompts to play next and performing analog to digital and digital to analog conversion of sound and human voice. Upon establishing a link between the interactive platform 12 and the outside caller 14, the interactive platform 12 plays a prerecorded message, prompting the outside caller 14 to input selected information on the touch-tone keypad or other similar mechanism associated with the telephone apparatus 16.

The interactive platform 12 also includes a host processor 26 for processing classified ads obtained from newspapers and storing the processed ads in a relational database 28. The processed ad contains an expanded version of the newspaper text, and may also contain graphic images (either still frame or multiple frame). The processor 26 is programmed to create audio ads in the form of a sequenced list of audio files that are connected by glue word files which together present the information in the newspaper ad in a natural sounding way. The ads in the relational database 28 may be located based on search criteria specified by the caller 14 and as requested by the audiotex subsystem 24. The host processor 26 also controls the operator workstation terminals and keeps track of the status of each operator. The audiotex subsystem 24 requests the host processor 26 to perform a database hookup at various stages in the call after a search criteria has been entered by the caller 14. The ads returned to the audiotex subsystem 24 by the host processor 26 is a list of the file addresses of each audio file in sequential order that must be played to comprise the scripted ad. The list also includes the addresses of glue words i.e. words that connect certain words or phrases to form natural sounding sentences.

The interactive platform 12 includes at least one operator work station 30. The operator work station 30 includes a computer terminal/keyboard 32 coupled to the host processor 26. Each operator work station 30 is equipped with a telephone apparatus 34, such as a touchtone telephone, that uses a standard private party business line 35 in which the telephone number is not published. The business line 35 is purchased and provided by the local RBOC via the PSTN 18. An operator 36 interacts with the computer terminal/keyboard 32 and the telephone apparatus 34. A more detailed description of the system shown in FIG. 1, may be found in copending patent application entitled Method and System for Providing Interactive Data Exchange Between an Interactive Platform and a Caller Serial Number 08/587,115 filed December, 1995, and assigned to the assignee of the present invention.

Figure 2:
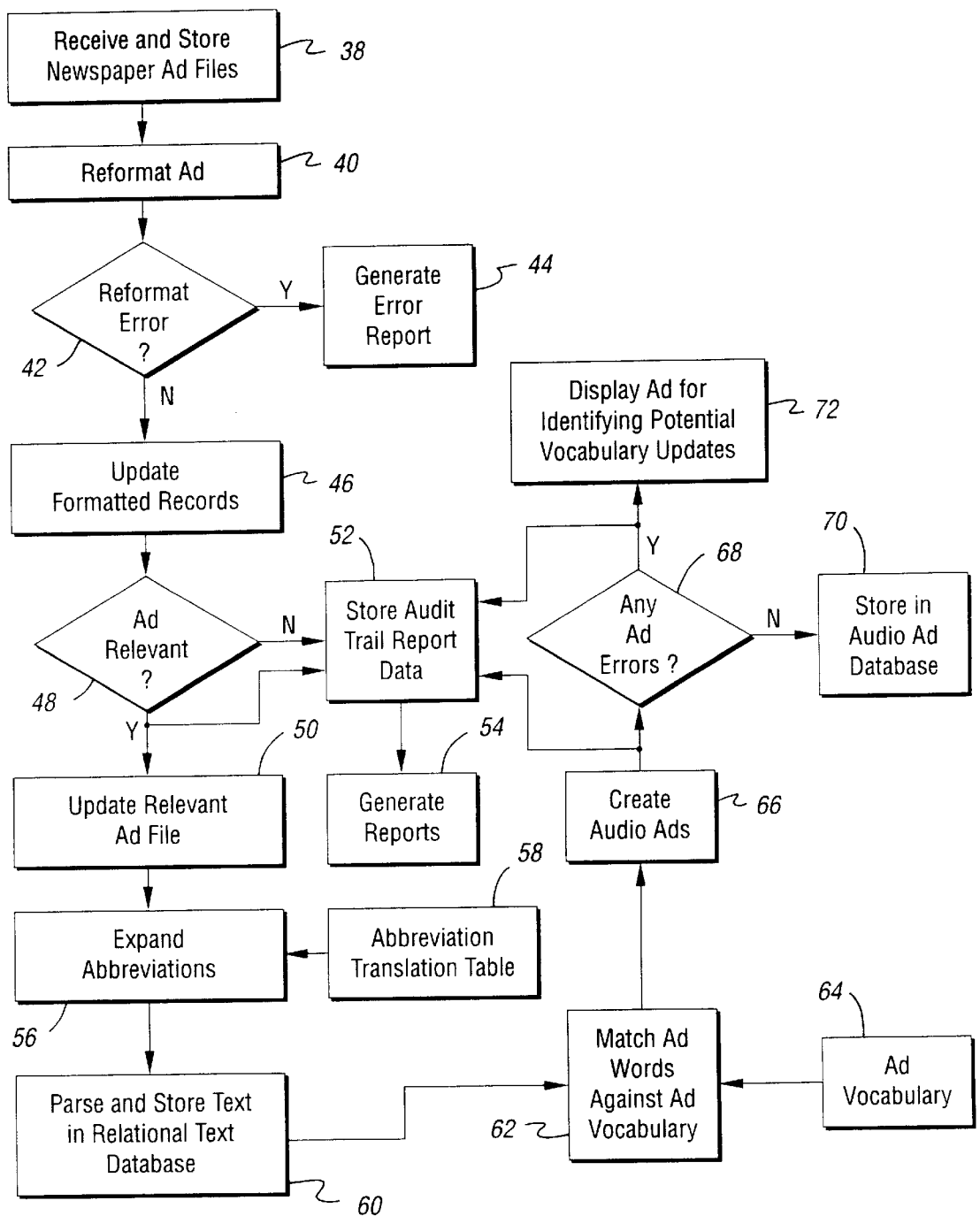
FIG. 2 is a flow chart of the computer program depicting the method of the present invention; and, FIGS. 3(a)–3(e) illustrate a sequence of steps in converting an unstructured print media ad to a scripted audio ad.
Figure 3A:
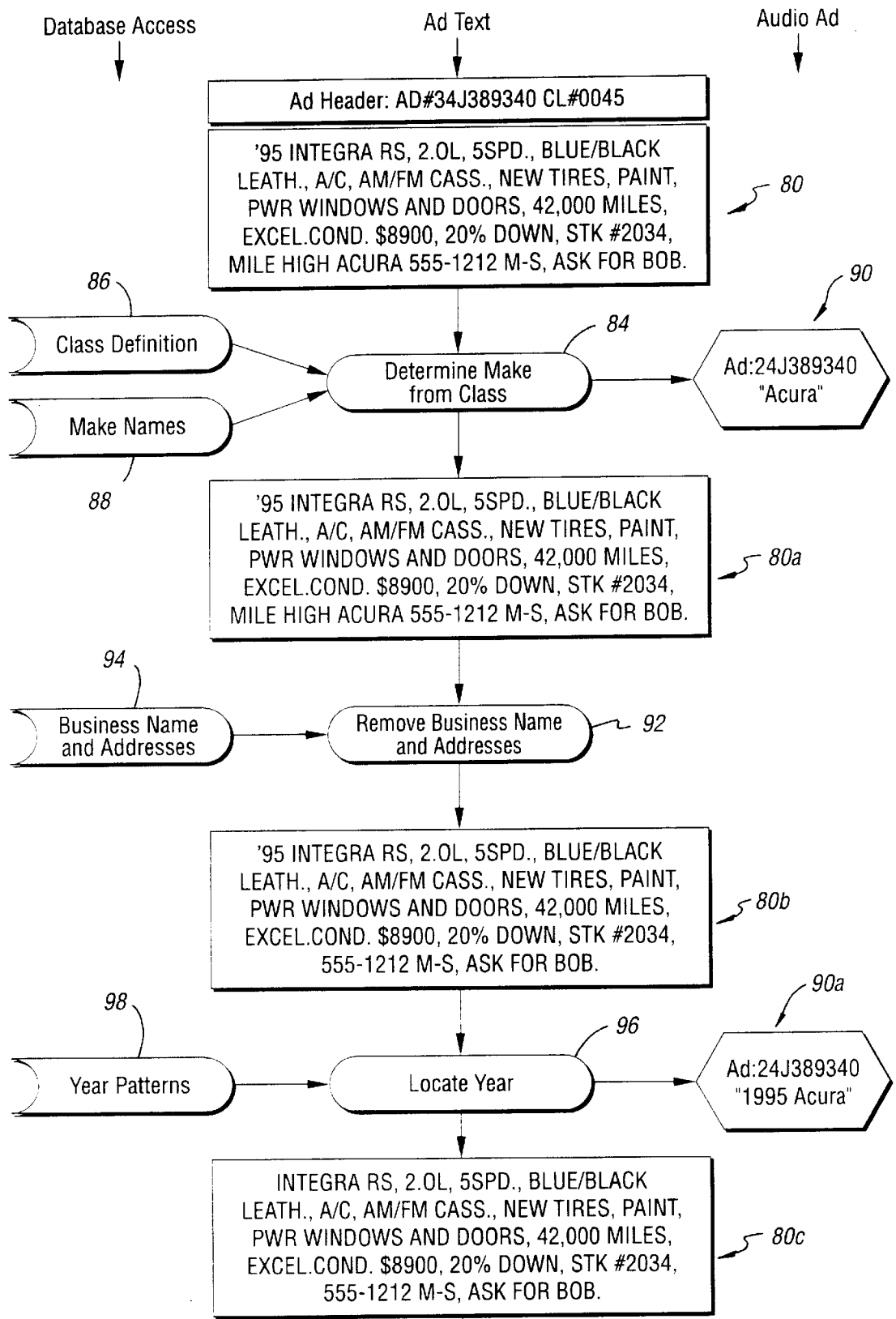
Figure 3B:
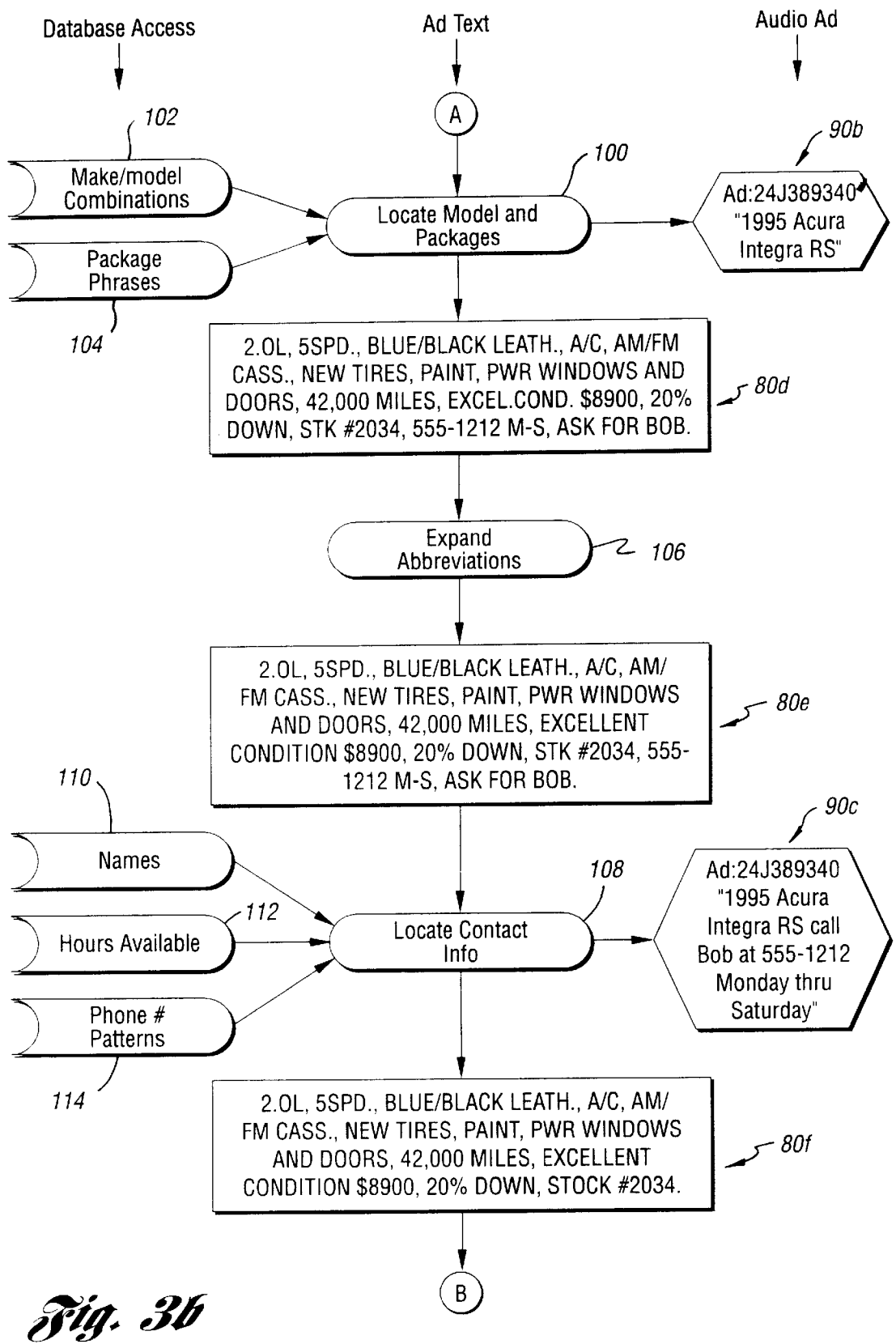
Figure 3C:
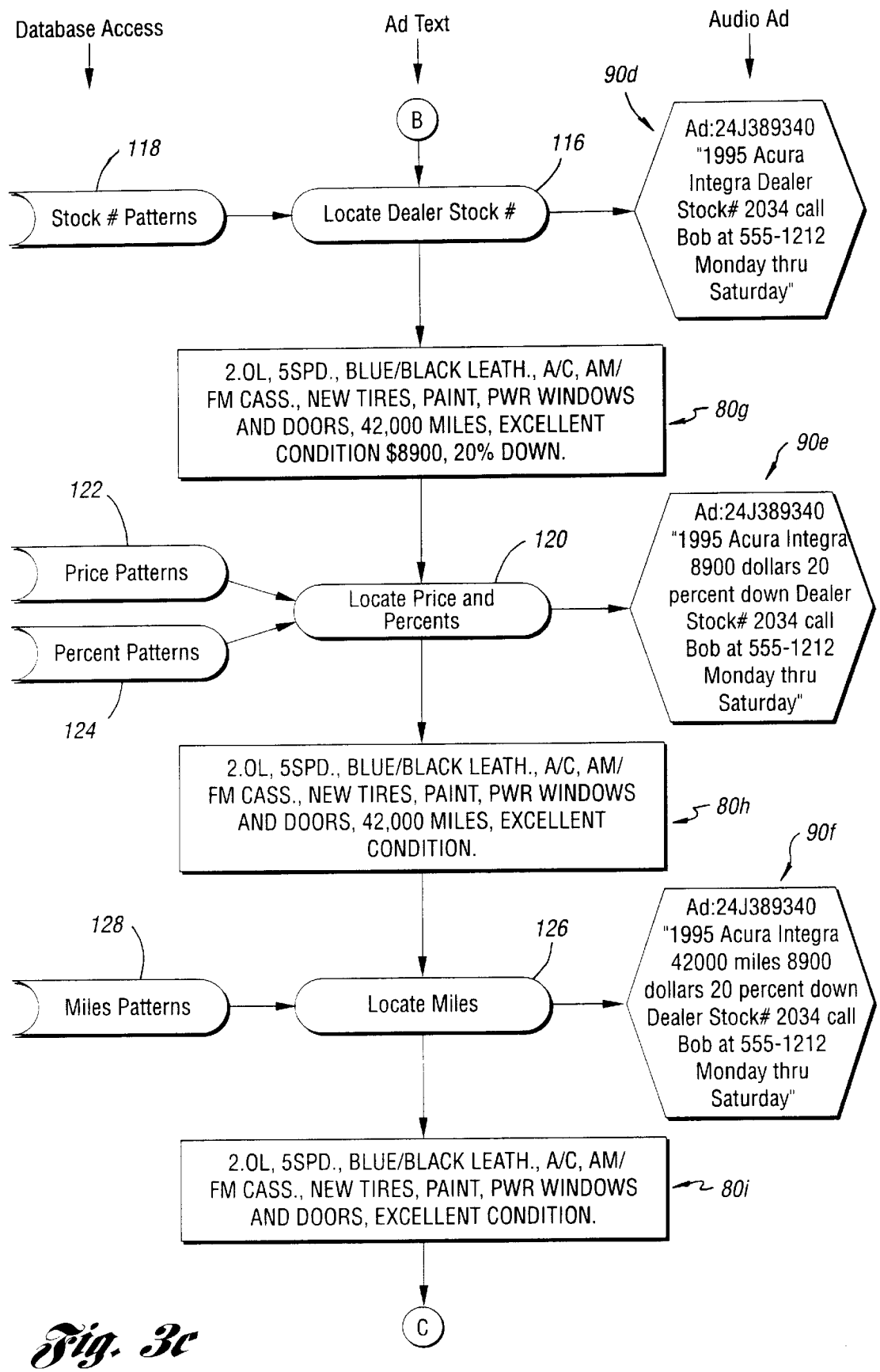
Figure 3B:
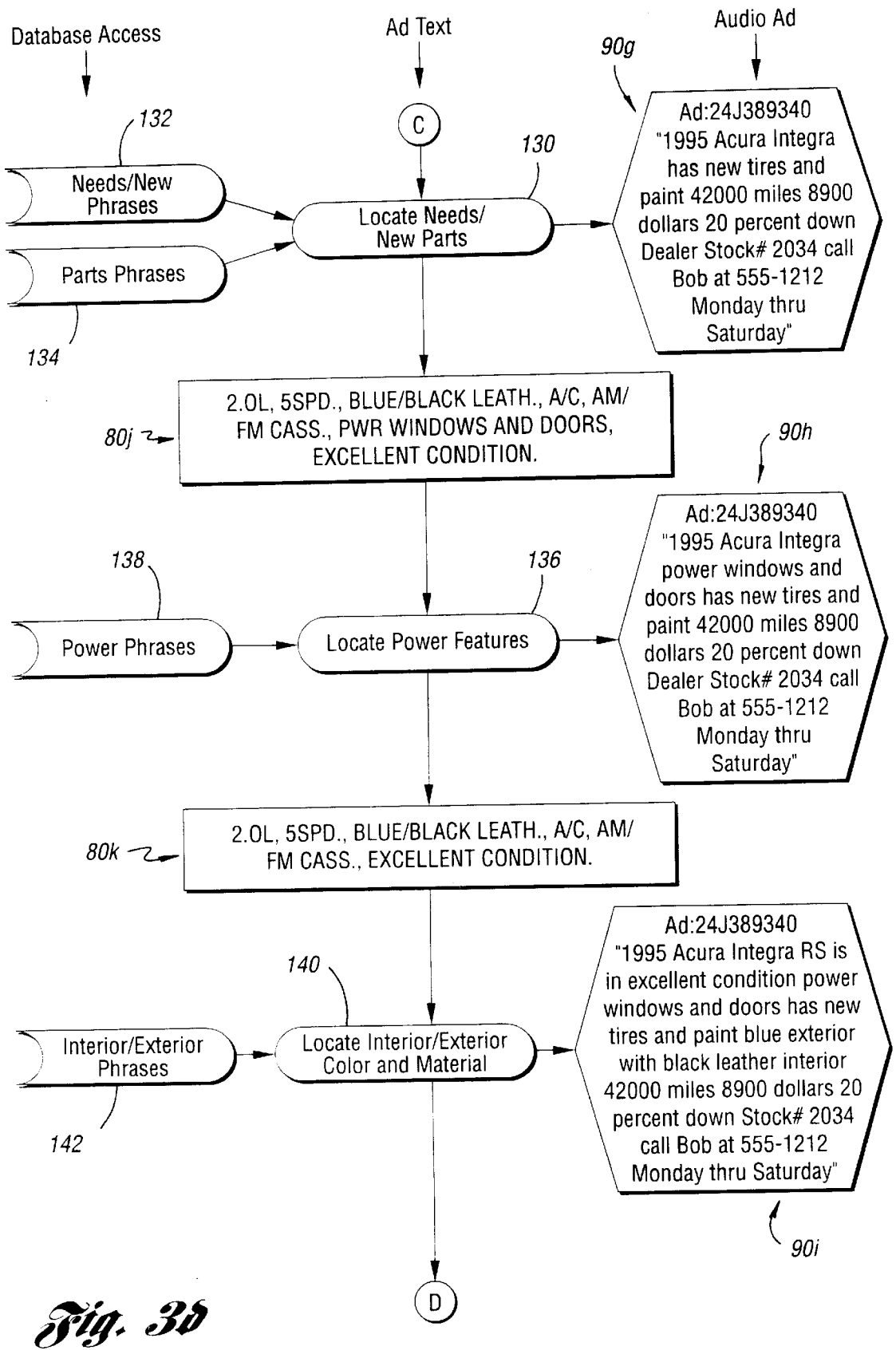
Figure 3E:
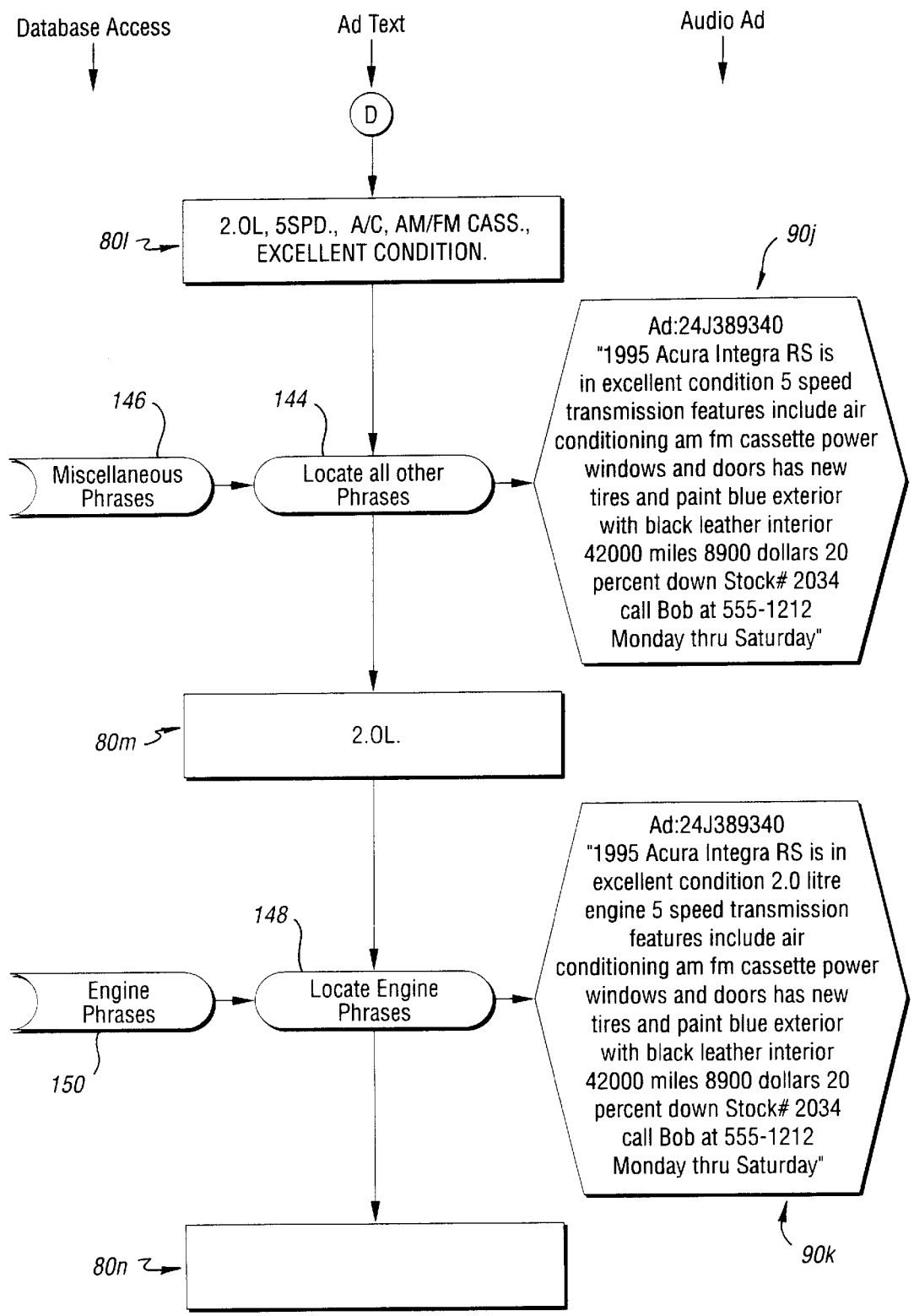

Referring now to FIG. 2, a flowchart is shown of the method for converting an abbreviated newspaper text ad to a searchable and voiceable natural language ad. An electronic file of the newspaper ads is downloaded over a data line from the newspaper computer database to the processor 26 and is stored in memory for further processing as indicated at 38. The block 38 may also detect from the ad record number received, whether the ad is a new ad or a change to an existing ad or whether the ad is an existing ad that should be deleted. This may be done by analyzing the record number in the header. The last digit may be used to identify the type of record. If the record identifies an ad to be deleted, the record is excluded from further processing beyond location and deletion of the record from memory. As an alternative to downloading ads from a newspaper database, it will be understood that the data could be entered into the system directly from an auto dealer over a dial-up connection, via pre-formatted facsimile, or by entry from a diskette.

The data defining a new or changed ad is reformatted at 40 to achieve a predetermined ordering or sequence of the ad header information that is more readily processed in the subsequent steps. Any errors in transmission or reformatting are detected at block 42 and reported at block 44. Error free formatted ads are stored as indicated at block 46 and checked for relevant headings as indicated at 48. Those ads that are relevant to the particular database of interest, for example auto ads, are stored to update the auto ad file, as indicated at block 50. The relevant ads may be displayed and or printed for review if desired. Statistical records relating to the number and type of processed ads as well as other data are gathered and stored to provide an audit trail as indicated at block 52. A report of the data may be generated at block 54 as desired. A typical update report would include the total number of records received, the number received by category and type and the number of ads rejected and the reason for the error.

The auto ad is expanded from the abbreviated form that usually appears in the newspaper to an expanded text version of the ad by comparing or matching the words in the ad with a list of abbreviations stored in memory as indicated by the blocks 56 and 58. The text is parsed and stored in a relational database as indicated at block 60. The parsing in block 60 may also include matching similar words and phrases to other words contained in synonym tables to reduce the number of audio files needed without changing the meaning contained in the original newspaper ad. The text in the relational database is matched with words in an ad vocabulary table, as indicated at blocks 62 and 64. The table 64 identifies numbered audio files stored in the audiotex subsystem 24 that correspond to the words and phrases in the database. A sequenced list of audio files is created at 66 in accordance with a set of rules that inserts glue words between certain words and phrases to make the ad sound more natural. Ads are checked for errors as indicated at decision block 68 and the record of the list of audio files for playing the successfully constructed ad is added to the audio ad database at 70. If any of the words or phrases of the ad cannot be associated with existing audio files then the entire update record is flagged and/or displayed and stored as indicated at block 72. The words and phrases that are not recognized may be added to the ad vocabulary and the abbreviation translation table for use in future processing.

The processing of an ad depicted in FIG. 2 is further illustrated in FIG. 3 where a typical auto ad is parsed to show how a text version of the final audio ad would be assembled. The abbreviated text of the ad is set out in block 80 and is processed by comparison with various lists in a desired sequence. The lists contain all known variations of a particular bit of information contained in newspaper auto ads. It will be understood that the audio ad would be assembled "on the fly" by the audiotex subsystem from the list of audio files constructed as a result of the parsing operations depicted.

As indicated at block 84 the make of the auto is determined from the class data (CL#0045) contained in the ad header based on lists 86 and 88, of Class Definitions and Make Names respectively, stored in memory. The class definitions permit the selective processing of the ads of interest such as auto ads. The text of the audio ad that would be composed based on this processing is indicated at 90 and the text remaining in the ad after this processing is indicated at 80*a*. As indicated at block 92 the Business Name and Addresses are removed from the ad by comparison with a corresponding list 94 resulting in the ad text 80*b*. As indicated at block 96 the year of the auto is Located and extracted by comparison with a list of Year Patterns indicated at 98. The text of the original ad and the audio ad based on this processing are indicated at 80*c* and 90*a* respectively.

At block 100 the text ad is processed to locate Model and Packages information contained in the ad by comparing the ad text with lists 102 and 104, to extract the text indicated at 90*b*. The remaining text ad indicated at 80*d* is processed to expand the abbreviations contained in the ad, as indicated at 106, to produce the expanded text of 80*e*. As indicated at block 108 the Contact information is located and extracted by comparison with list 110, 112, and 114. The text indicated at 90*c* would be added to the previously extracted text and connected during construction of the audio ad by the glue words "call", "at", and "thru".

The ad text remaining at this point in the processing is indicated at 80f and is further processed to locate the Dealer Stock # at step 116 through comparison with the list 118. The processing at step 116 adds the text of the audio ad detailed at 90d with the glue word "Dealer". The remaining text ad 80g is processed at 120 using lists 122 and 124 to locate Price and Percent information to produce the text indicated at 90e with the glue word "dollars". As indicated at processing step 126 the Miles information is ascertained from the remaining text 80h using list 128 and added to the audio ad being compiled as indicated at 90f.

The remaining text ad at 80i is further processed at 130 using lists 132 and 134 to locate information regarding New Parts that have been recently purchased for the auto or those parts that need to be replaced in the near future. This results in the audio ad text indicated at 90g with the glue words "has" and "and" added. The remaining text ad at 80j is processed at 136 to locate Power Features recited in the ad using list 138 to form the basis of the text indicated at 90h. The processing step at 140 uses the list 142 to locate Interior/Exterior Color and Material information in the text 80k in order to produce the audio ad text 90i with the glue words "exterior with" and "interior" added. The remaining text ad at 80l is processed at 144 using the list 146 to locate miscellaneous phrases and produce the audio version 90j with the glue words "is in" and "features include". The engine phrases in the remaining portion of the text ad 80m is located at 148 by using the list 150 and produces the final version of the audio ad 90k with the glue words "litre engine" added. The empty block 80n is indicative of the completion of the parsing of the original ad.

While the forms of the invention herein disclosed are presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A method for automatically generating an audio ad from a text record, the method comprising the following steps:

receiving an electronic version of the record comprising words and abbreviations of words;

processing the record to expand certain abbreviations of words in the record;

parsing the words and the expanded words from the record based on predetermined lists to create a plurality of audio files;

creating a sequenced list of addresses of audio files corresponding to the parsed words based on a predetermined set of rules; and generating the audio ad based on the sequenced list of addresses.

2. The method defined in claim 1 comprising the further steps of:

storing the sequenced list of audio file addresses in an audio ad database;

searching the audio ad database for ads matching a request from a remote user; and composing at least one audio ad using the sequenced list of audio file addresses corresponding to the ads matched in said database.

3. The method defined in claim 1 wherein the record comprises a header and further comprises the step of examining the header of the record to determine whether the record requires processing.

4. The method defined in claim 1 wherein the record comprises a header and further comprises the step of determining a make of an automobile from the header information.

5. The method defined in claim 1 comprising the further step of:

generating an error message when a record is not processed correctly.

6. The method defined in claim 1 wherein creating the sequenced list of addresses further includes inserting a list of addresses of audio files corresponding to glue words between certain words and expanded words to form natural sounding audio ads.

7. A method of generating an audio ad from an electronic ad, the method comprising the steps of:

receiving an electronic ad comprising words;

expanding certain abbreviated words contained in the electronic ad;

inserting glue words before, after, or between one or more words in the expanded electrode ad to generate a modified ad;

identifying known words in the modified ad;

creating a sequenced list of addresses of audio files corresponding to the identified words in the modified ad based on a predetermined set of rules; and generating the audio ad based on the sequenced list of addresses.

8. The method of claim 7, further comprising the steps of:

identifying search words in the expanded ad, and storing the search words in a database.

9. The method of claim 7 further comprising the step of:

storing the modified ads in a computer memory to obtain a searchable database of audio ads.

10. The method of claim 9 further comprising the step of:

receiving a search request from a remote user;

searching the database for ads matching the request; and composing at least one audio ad using the sequenced list of addresses corresponding to the ads matched in the database.

* * * * *